United States Patent [19]

Hartman et al.

[11] Patent Number: 5,230,030
[45] Date of Patent: Jul. 20, 1993

[54] INTERFACE COUPLING ELECTRONIC CIRCUITRY

[75] Inventors: Davis H. Hartman, Phoenix; Michael S. Lebby, Chandler; Melissa Denvir; Christopher K. Y. Chun, both of Mesa, all of Ariz.

[73] Assignee: Motorola, Inc., Schaumburg, Ill.

[21] Appl. No.: 873,261

[22] Filed: Apr. 24, 1992

[51] Int. Cl.[5] ............................................. G02B 6/26
[52] U.S. Cl. ..................................... 395/50; 385/31; 385/88; 385/89
[58] Field of Search ...................... 385/50, 53, 31, 39, 385/88, 89

[56] References Cited

U.S. PATENT DOCUMENTS

| | | | |
|---|---|---|---|
| 4,645,295 | 2/1987 | Provenost | 385/88 |
| 5,028,110 | 7/1991 | Plummer | 385/39 |
| 5,062,681 | 11/1991 | Furmanak et al. | 385/50 |
| 5,074,638 | 12/1991 | Poli et al. | 385/50 |

Primary Examiner—John D. Lee
Assistant Examiner—S. W. Barns
Attorney, Agent, or Firm—Eugene A. Parsons

[57] ABSTRACT

An optical interface including a keyway formed in a printed circuit board and a mating portion attached to the ends of a plurality of optical fibers. Openings in a surface of the keyway communicate light from the fibers to semiconductor chips on the board by means of optical waveguides formed in the dielectric layers of the printed circuit board. The keyway accurately aligns the mating portion which aligns the ends of the fibers with the openings.

15 Claims, 2 Drawing Sheets

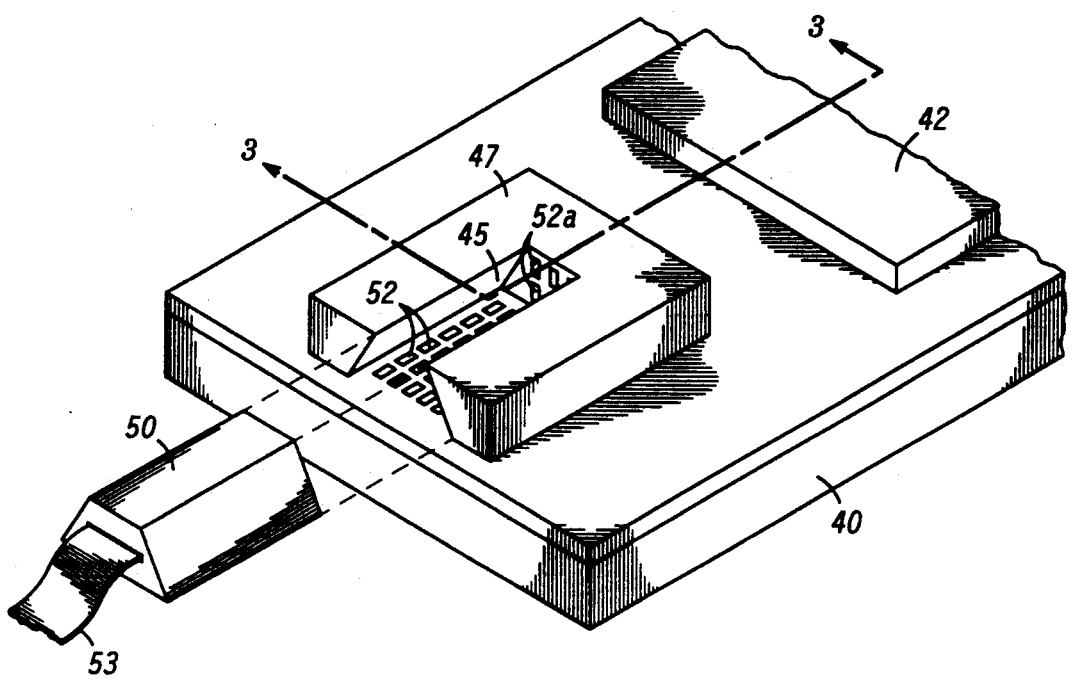
FIG. 2
FIG. 3
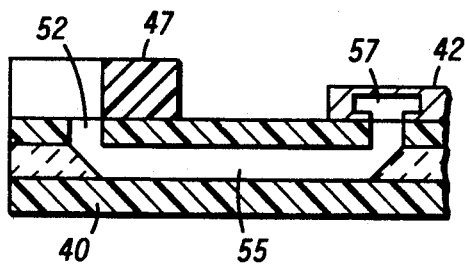

INTERFACE COUPLING ELECTRONIC CIRCUITRY

The present invention pertains to optical couplings for electronic circuitry and more specifically to optical coupling multichip modules and the like.

BACKGROUND OF THE INVENTION

Multichip modules (MCMs) are rapidly becoming the package medium of choice for high density packaging of ICs. These modules allow for tight IC pitch and high interconnect density.

Multichip modules include enclosing in leadless packages, solder bumping from the multichip module to a mother board, or TAB bonding. Provisioning of means for optical fiber I/O is also necessary where optically interconnected modules are used. Examples of applications for optical fiber use include main frame computers, work stations, broadband telephone-based switching stations (where SONET and ATM are implemented), etc.

There is a need to interface optical communication systems to multichip modules so that the electronics circuits that are used inside the multichip modules can interface with improved speed and efficiency to other multichip modules, boards, computer systems, etc.

SUMMARY OF THE INVENTION

It is a purpose of the present invention to provide an optical interface which is small, inexpensive to manufacture and convenient to use.

It is a further purpose of the present invention to provide an optical interface which is conveniently connected and disconnected to printed circuit boards and the like.

These and other needs and advantages are realized through an interface for optically coupling to electronic circuitry including a base for mounting electronic circuits thereon and having formed therein a keyway with guide rails having axial alignment means associated therewith, a first plurality of optical waveguides mounted in the base with each waveguide having an optical input/output positioned in a first surface of the keyway, and a keyway mating portion formed to slideable engage the keyway guide rails and axial alignment means to align at least one surface of the mating portion in two orthogonal directions with the first surface of the keyway, the mating portion including a second plurality of optical waveguides mounted therein with one end of each of the second plurality of waveguides being positioned to be aligned with one of the input/outputs positioned in the first surface when the mating portion is slideably engaged in the keyway, and each of the second plurality of waveguides further having one end of an external optical fiber operatively connected thereto.

Brief Description of the Drawings

Referring to the drawings:

FIG. 2 is a view in perspective, portions thereof broken away, of a second embodiment of a multichip module optical interface embodying the present invention; and FIG. 3 is a sectional view as seen from the line 3—3 of FIG. 2.

Description of the Preferred Embodiment

Figure 1:
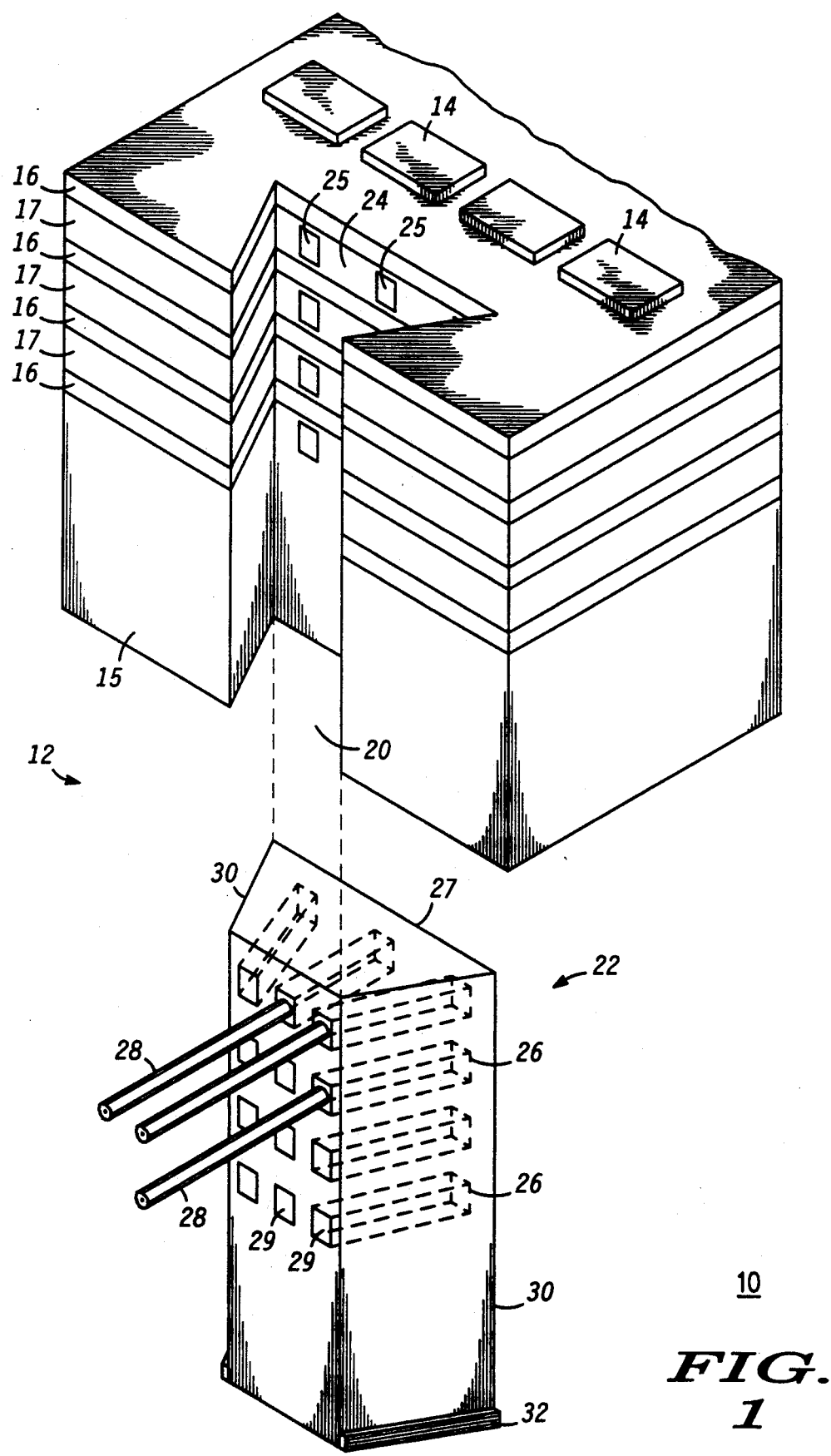
FIG. 1 is a view in perspective, portions thereof broken away, of a multichip module optical interface embodying the present invention.

Referring specifically to FIG. 1, a multichip module 10 with an optical interface 12 embodying the present invention is illustrated. Multichip module 10 includes a plurality of semiconductor chips 14 (ICs) mounted on a base 15, which is at least partially formed from a printed circuit board. Base 15 includes a plurality of layers 16 of conducting material and layers 17 of insulating material sandwiched together to provide desired electrical connections between the various components mounted thereon, as is well known in the printed circuit art.

Optical interface 12 includes a keyway 20 formed in one side of base 15 and a keyway mating portion 22 adapted to be slideably engaged in keyway 20. In this specific embodiment, keyway 20 is formed generally perpendicular to a plane parallel with layers 16 and 17 and has a generally dovetailed cross-section. A surface 24 of keyway 20 has a plurality of optical input/outputs 25 formed therein. Each input/output is formed in one of the layers 17 of insulating material and is in optical communication with an optically transparent portion of the layer 17. Depending upon the application, the optically transparent portions of layer 17 form waveguides that communicate light through layer 17 and to one or more semiconductor chips 14. In some applications the entire layer may be optically transparent and in some applications layers 17 may be formed of two or more different materials, one of which is optically transparent and forms optically transparent waveguides within the other material. A typical example of the waveguide forming material is a material sold under the trademark POLYGUIDE by E. I. DuPont de Nemours, and Company. Generally, the materials are polymer based and optically transparent waveguides within layers 17 are photolithographicly defined.

In this specific embodiment, layers 17 are formed of a clear plastic material having a low index of refraction of approximately 1.52. It is especially desirable to form entire layers 17 of clear plastic for holographic optical interconnecting techniques because of the diffractive optics utilized. Channels are formed in the clear plastic by some convenient means such as molding, etching, etc. The formation of layers 17 and the channels may be, for example, by a plastic molding technique used under the trademark "GUIDECAST" by MOTOROLA, Inc. The channels are formed to provide waveguides within the layer 17 having the desired shape and communicating with the desired optical input/outputs 25 and the chips 14. The channels are then filled with an optically clear plastic having a relatively high index of refraction, in this embodiment approximately 1.56. The optically clear plastic forming the waveguide has an attenuation loss of as low as 0.01 db/cm. at 850 nm range wavelength. While the specific refractive indexes of the materials may change from the above example, it is important that the refractive index of the material in the channels be higher than the refractive index of the material in layer 17 defining the channels so that light is contained within the waveguides, thereby reducing light loss.

Keyway mating portion 22 also has a plurality of optical waveguides 26 formed therein by any convenient method, such as the same methods and materials utilized to form the waveguides in layers 17. Waveguides 26 are positioned in portion 22 so that one end of each waveguide 26 lies in a surface 27 of portion 22. Surface 27 is parallel and in abutting engagement with surface 24 of keyway 20 when portion 22 is mated within keyway 20. Further, waveguides 26 are positioned so that the one end of each waveguide 26 is in optical communication with one input/output 25 when portion 22 is mated within keyway 20. The opposite end of each waveguide 26 has an optical fiber 28 operatively connected thereto.

In general, waveguides 26 are formed with approximately the same outer dimensions as fibers 28 and fibers 28 are connected by any convenient means such as curable polymers and the like. Waveguides 26, and the waveguides in layers 17, are tapered slightly adjacent the optical input/output to allow for easy alignment. This tapering effect is easily incorporated because of the molding techniques utilized in the construction of the waveguides. As an example, a light input is tapered outwardly so as to be slightly larger than a mating optical fiber or light output so that light from the output dumps into a slightly larger waveguide, called a light bucket. The light outputs are tapered to be slightly smaller by adiabatic tapering. The result of the tapering is that alignment and manufacturing tolerances are substantially relaxed and, therefore, costs etc. are reduced.

In this embodiment waveguides 26 are formed so that they do not extend to the opposite side of portion 22 and, therefore, an opening 29 remains in portion 22 at the opposite end of each waveguide 26. One end of each fiber 28 is positioned in one of the openings 29 and a curable polymer is used to hold it fixedly in place. Fiber 28 and waveguide 26 can be actively aligned prior to fixing fiber 28, by using a light source at one end and a photodetector at the other end and moving fiber 28 for maximum light transmission. Once maximum light transmission is achieved, the curable polymer, adhesive, etc. is applied to fix fiber 28 in opening 29.

While keyway 20, and portion 22 are formed with a dovetail cross-section in this specific embodiment, it should be understood that any convenient configuration which aligns surfaces 24 and 27 and holds them in abutting engagement for optical communication between input/outputs 25 and waveguides 26 can be utilized. In particular, keyway 20 has a pair of guide rails which guide the movement of portion 22 into keyway 20. In the dovetail cross-section of the FIG. 1 embodiment, angularly shaped longitudinal edges 30 form guide rails which align portion 22 in a first direction. Guide rails can also have cross-sections which are rectangular, semi-circular, angular, or any combination thereof Axial alignment apparatus 32 is utilized to stop movement of portion 22 into keyway 20 when the correct mating position is achieved. In this specific embodiment axial alignment apparatus 32 is a stop, or shoulder, formed at the lower end of portion 22. It will of course be understood that axial alignment apparatus 32 can be any convenient stop, detent, spring loaded locks, or combination thereof. Further, in most applications it is preferred to incorporate axial alignment apparatus that holds portion 22 fixedly in the mating position once that position is achieved. Thus, once portion 22 is matingly engaged in keyway 20, surface 27 is aligned with surface 24 in two orthogonal directions and optical communication between input/outputs 25 and waveguide 26 is complete.

Referring to FIG. 2, a second embodiment of a base 40 is disclosed having semiconductor chips 42 mounted thereon. In this specific embodiment a keyway 45 is formed on a major surface of base 40 by a layer 47 of material integrally attached to and forming a part of base 40. Layer 47 could also be attached to the surface of base 40 by some convenient means such as adhesive, bonding, soldering, welding, etc. In this specific embodiment a keyway mating portion 50 mates with keyway 45 similar to the mating described in conjunction with the structure of FIG. 1, except that the major surface of base 40 has input/outputs 52 formed therein. Also, keyway 45 formed in layer 47 is a blind keyway with the axial alignment apparatus formed integrally therewith. In some applications it may be desirable to position optical input/outputs 52a in the blind end of the keyway, or in some applications optical input/outputs may be placed in the angular sides of the keyway, or in some applications combinations of the positions may be utilized. Also, in this embodiment optical fibers 53 are engaged in one end of portion 50, rather than the opposite surface thereof.

A waveguide 55 formed in base 40 is illustrated in FIG. 3. Waveguide 55 directs light from waveguides in portion 50 through base 40 to a transducer 57 on semiconductor chip 42. In the specific embodiment illustrated in FIG. 3, the direction of light is redirected at each end of waveguide 55. It will be understood, however, that bent waveguides may be utilized or, in the embodiment utilizing optical input/outputs 52a in the blind end of keyway 45, light may travel by waveguides on the surface of base 40 directly into semiconductor 42.

Thus, an interface for optically coupling to electronic circuitry is illustrated which is small. Simple to manufacture and relatively inexpensive. Further, the interface is extremely versatile and can be modified slightly to fit virtually any applications. Utilizing the interface, optical connections can be made to virtually any electronic systems, and particularly to MCMs and the like which are normally interconnected on printed circuit boards. By utilizing optical connections, interference is reduced and speed of information interchange is increased. Also, because the present interface is small, convenient and inexpensive, it can be used in many places that prior structures could not be used.

While we have shown and described specific embodiments of the present invention, further modifications and improvements will occur to those skilled in the art. We desire it to be understood, therefore, that this invention is not limited to the particular forms shown and we intend in the append claims to cover all modifications that do not depart from the spirit and scope of this invention.

What is claimed is:

1. An interface for optically coupling to electronic circuitry comprising:
 a base for mounting electronic circuits thereon and having formed therein a keyway with guide rails having axial alignment means associated therewith;
 a first plurality of optical waveguides mounted in the base with each waveguide having an optical input/output positioned in a first surface of the keyway;
 a keyway mating portion formed to slideable engage the keyway guide rails and axial alignment means to align at least one surface of the mating portion in two orthogonal directions with the first surface of the keyway, the mating portion including a second plurality of optical waveguides mounted therein with one end of each of the second plurality of waveguides being positioned to be aligned with one of the input/outputs positioned in the first surface when the mating portion is slideably engaged in the keyway, and each of the second plurality of waveguides further having one end of an external optical fiber operatively connected thereto.

2. An interface for optically coupling to electronic circuitry as claimed in claim 1 wherein the base includes a multi-layer printed circuit board.

3. An interface for optically coupling to electronic circuitry as claimed in claim 2 wherein the multi-layer printed circuit board includes an insulating layer with the first plurality of optical waveguides mounted therein.

4. An interface for optically coupling to electronic circuitry as claimed in claim 3 wherein the first plurality of optical waveguides are formed by plastic molding.

5. An interface for optically coupling to electronic circuitry as claimed in claim 4 wherein the first plurality of optical waveguides are formed of an optically clear plastic material having an index of refraction higher than material in the insulating layer surrounding the first plurality of optical waveguides.

6. An interface for optically coupling to electronic circuitry as claimed in claim 5 wherein the index of refraction of the optically clear plastic material in the first plurality of optical waveguides is approximately 1.52 and the index of refraction of the material surrounding the first plurality of optical waveguides is approximately 1.56.

7. An interface for optically coupling to electronic circuitry as claimed in claim 3 wherein the keyway is formed in the printed circuit board with the first surface of the keyway being generally perpendicular to the insulating layer.

8. An interface for optically coupling to electronic circuitry as claimed in claim 3 wherein the keyway is formed in the printed circuit board with the first surface generally parallel to a major surface of the printed circuit board.

9. An interface for optically coupling to electronic circuitry as claimed in claim 1 wherein the axial alignment means includes a stop positioned adjacent one end of the guide rails.

10. An interface for optically coupling to electronic circuitry comprising:
a base for mounting electronic circuits thereon and having formed therein a keyway with a generally dovetail cross-section;
a first plurality of optical waveguides mounted in the base with each waveguide having an optical input/output positioned in a first surface of the keyway;
a keyway mating portion formed to slideable engage the keyway and to align at least one surface thereof in two orthogonal directions with the first surface of the keyway, the mating portion including a second plurality of optical waveguides mounted therein with one end of each of the second plurality of waveguides being positioned to be aligned with one of the input/outputs positioned in the first surface when the mating portion is slideably engaged in the keyway, and each of the second plurality of waveguides further having one end of an external optical fiber operatively connected thereto.

11. An interface for optically coupling to electronic circuitry as claimed in claim 10 wherein the base includes a multi-layer printed circuit board having an insulating layer with at least a portion thereof being optically transparent.

12. An interface for optically coupling to electronic circuitry as claimed in claim 10 wherein the second plurality of optical waveguides are formed by plastic molding.

13. An interface for optically coupling to electronic circuitry as claimed in claim 12 wherein the second plurality of optical waveguides are formed of an optically clear plastic material having an index of refraction higher than material in the keyway mating portion surrounding the second plurality of optical waveguides.

14. An interface for optically coupling to electronic circuitry as claimed in claim 13 wherein the index of refraction of the optically clear plastic material in the second plurality of optical waveguides is approximately 1.52 and the index of refraction of the material surrounding the second plurality of optical waveguides is approximately 1.56.

15. An interface for optically coupling to electronic circuitry comprising:
a base for mounting electronic circuits thereon and having formed therein a keyway with guide rails having axial alignment means associated therewith, the base including a multi-layer printed circuit board with at least one insulating layer having portions that are optically transparent;
a first plurality of optical input/outputs, associated with the optically transparent portions of the one insulating layer of the printed circuit board, positioned in a first surface of the keyway;
a keyway mating portion formed to slideable engage the keyway guide rails and axial alignment means to align at least one surface of the mating portion in two orthogonal directions with the first surface of the keyway, the mating portion including a plurality of optical waveguides mounted therein with one end of each of the plurality of waveguides being positioned to be aligned with one of the input/outputs positioned in the first surface when the mating portion is slideably engaged in the keyway, and each of the plurality of waveguides further having one end of an external optical fiber operatively connected thereto.

* * * * *